US012748754B2

(12) United States Patent
Cheon et al.

(10) Patent No.: US 12,748,754 B2
(45) Date of Patent: Sep. 29, 2026

(54) ELECTRONIC DEVICE AND SERVER DEVICE RESPONDING TO ENCRYPTED QUERY AND METHODS THEREOF

(71) Applicant: CRYPTO LAB INC., Seoul (KR)

(72) Inventors: Jung Hee Cheon, Seoul (KR); Keewoo Lee, Seoul (KR)

(73) Assignee: CRYPTO LAB INC., Seoul (KR)

( * ) Notice: Subject to any disclaimer, the term of this patent is extended or adjusted under 35 U.S.C. 154(b) by 0 days.

(21) Appl. No.: 18/925,390

(22) Filed: Oct. 24, 2024

(65) Prior Publication Data

US 2025/0139090 A1 May 1, 2025

(30) Foreign Application Priority Data

Oct. 25, 2023 (KR) ........................ 10-2023-0144213
Sep. 20, 2024 (KR) ........................ 10-2024-0127246

(51) Int. Cl.

*G06F 16/2453* (2019.01)
*G06F 17/16* (2006.01)
*H04L 9/00* (2022.01)

(52) U.S. Cl.

CPC .......... *G06F 16/2453* (2019.01); *G06F 17/16* (2013.01); *H04L 9/008* (2013.01)

(58) Field of Classification Search

CPC ....... G06F 16/2453; G06F 17/16; H04L 9/008
USPC .......................................................... 707/765
See application file for complete search history.

(56) References Cited

U.S. PATENT DOCUMENTS 7,933,885 B1 * 4/2011 Lambiri .................... G06F 7/02 707/706
9,846,785 B2 * 12/2017 Bacon ..................... H04L 9/008
10,341,086 B2 * 7/2019 Gajek ................... H04L 9/3218
11,003,783 B1 * 5/2021 Ursachi ................. G06F 21/602
(Continued)

FOREIGN PATENT DOCUMENTS

CN 114428972 A * 5/2022 ......... G06F 21/6245
CN 115098515 A * 9/2022 ......... G06F 16/2228
(Continued)

OTHER PUBLICATIONS

Choi et al., "Compressed Oblivious Encoding for Homomorphically Encrypted Search", arXiv:2109.07708v1 [cs.CR], Sep. 16, 2021, 15 pages, <https://doi.org/10.48550/arXiv.2109.07708> (Year: 2021).*
(Continued)

*Primary Examiner* — Phuong Thao Cao
(74) *Attorney, Agent, or Firm* — Steinfl + Bruno LLP

(57) ABSTRACT

Disclosed is a server device. The server device includes a communication unit configured to perform communication with an external device, a memory configured to store a database including a plurality of keys and data corresponding to each key, and a processor. When a homomorphic encrypted query is received, the processor is configured to acquire an index vector indicating at least one key matching the query from the database, and mask data of each key of the database to the index vector to acquire a data vector including data corresponding to at least one key. The processor is configured to compress each of the index vector and data vector and transmits the compressed index data and data vector to the external device. Accordingly, it is possible to efficiently perform a response to a query.

4 Claims, 13 Drawing Sheets

(56) References Cited

U.S. PATENT DOCUMENTS

| | | | | |
|---|---|---|---|---|
| 2005/0125310 | A1* | 6/2005 | Hazi | G06F 16/2428 707/E17.116 |
| 2015/0244517 | A1* | 8/2015 | Nita | H04L 63/0428 713/168 |
| 2017/0147835 | A1* | 5/2017 | Bacon | H04L 9/321 |
| 2018/0198601 | A1* | 7/2018 | Laine | H04L 9/3239 |
| 2018/0212757 | A1* | 7/2018 | Carr | G06F 9/30014 |
| 2019/0140818 | A1* | 5/2019 | Bent | H04L 9/3093 |
| 2019/0325082 | A1* | 10/2019 | Laine | G06F 16/901 |
| 2020/0151356 | A1* | 5/2020 | Rohloff | G06F 21/6245 |
| 2020/0358610 | A1* | 11/2020 | Yeo | G06F 16/9027 |
| 2021/0194668 | A1* | 6/2021 | Masters | G06F 21/602 |
| 2023/0289469 | A1* | 9/2023 | Uzun | H04L 9/0866 |
| 2023/0318809 | A1* | 10/2023 | Fox-Epstein | H04L 9/0894 713/171 |
| 2024/0097878 | A1* | 3/2024 | Lee | H04L 63/0442 |
| 2024/0104224 | A1* | 3/2024 | Ramos | H04L 9/0825 |
| 2024/0104234 | A1* | 3/2024 | Fox-Epstein | G06F 21/6245 |
| 2024/0297778 | A1* | 9/2024 | Kim | H04L 9/008 |
| 2024/0330500 | A1* | 10/2024 | Zaret | G06F 21/6227 |
| 2025/0192980 | A1* | 6/2025 | Patil | G06F 16/254 |

FOREIGN PATENT DOCUMENTS

| | | | | | |
|---|---|---|---|---|---|
| CN | 115237954 | A | * | 10/2022 | G06F 16/24553 |
| CN | 116401705 | A | * | 7/2023 | G06F 21/6227 |
| CN | 118551122 | A | * | 8/2024 | G06F 18/22 |
| EP | 3394737 | B1 | * | 6/2022 | G06F 9/30038 |
| EP | 3959841 | B1 | * | 6/2022 | H04L 9/008 |
| KR | 20220004201 | A | * | 1/2022 | H04N 21/2353 |
| WO | WO-2020254248 | A1 | * | 12/2020 | H04N 21/2353 |

OTHER PUBLICATIONS

Bienstock et al., "Batch PIR and Labeled PSI with Oblivious Ciphertext Compression", in Proceedings of the 33rd USENIX Security Symposium, Aug. 14-16, 2024, Philadelphia, PA, USA, pp. 5949-5966. (Year: 2024).*

Park et al., "A Survey of Oblivious Compression on Encrypted Data with Fully Homomorphic Encryption", 2024 15th International Conference on Information and Communication Technology Convergence (ICTC), IEEE, Oct. 16, 2024, pp. 474-479. (Year: 2024).*

Cheon et al., "SIMD-Aware Homomorphic Compression and Application to Private Database Query", arXiv:2408.17063v1 [cs.CR] Aug. 30, 2024, pp. 1-11. (Year: 2024).*

* cited by examiner

FIG. 11

Input: $\texttt{ctxt}(\boldsymbol{w})$ ▷ ciphertexts encrypting $\boldsymbol{w} \in \mathbb{Z}_p^s$

Step 1: Reconstruct $I_{\boldsymbol{v}}$ from $\texttt{ctxt}(\boldsymbol{w})$.

$\boldsymbol{w} \leftarrow \mathsf{Dec}(\texttt{ctxt}(\boldsymbol{w}))$ $I_{\boldsymbol{v}} \leftarrow \mathsf{ReconstIdx}(\boldsymbol{w})$

Step 2: Reconstruct $\boldsymbol{v}$ from $I_{\boldsymbol{v}}$. ▷ redundant step for formatting $$\boldsymbol{v} \leftarrow (v_1, \cdots, v_N), \text{ where } v_i = \begin{cases} 1, & \text{if } i \in I_{\boldsymbol{v}} \\ 0, & \text{otherwise.} \end{cases}$$

return $\boldsymbol{v}$

FIG. 12

Input: $w = (w_1, \cdots, w_s) \in \mathbb{Z}_p^s$

Step 1: Compute $f_v^s(X)$ from $w$ using Newton's identity.

$a_0 \leftarrow 1$
for $k = 1, \cdots, s$ do
  $a_k \leftarrow k^{-1} \cdot \sum_{i=1}^{k} (-1)^{i-1} a_{k-i} \cdot w_i$
end for
$f_v^s(X) \leftarrow \sum_{k=0}^{s} (-1)^k a_k X^{s-k}$

Step 2: Reconstruct $I_v$ from $f_v^s(X)$.

$g_v^s(X) \leftarrow f_v^s(X)$
while $X$ divides $g_v^s(X)$ do
  $g_v^s(X) \leftarrow g_v^s(X)/X$
end while
$I_v \leftarrow$ Find zeroes of $g_v^s(X)$ ▷ e.g. by the Cantor-Zassenhaus algorithm return $I_v$

FIG. 13

Input: $\mathtt{ctxt}(\boldsymbol{e}), \mathtt{ctxt}(\boldsymbol{w})$

▷ ciphertexts encrypting $\boldsymbol{e}, \boldsymbol{w} \in \mathbb{Z}_p^s$

Step 1: Reconstruct sparse($\boldsymbol{d}$) from $\mathtt{ctxt}(\boldsymbol{e})$ and $\mathtt{ctxt}(\boldsymbol{w})$.

$\boldsymbol{e} \leftarrow \mathsf{Dec}(\mathtt{ctxt}(\boldsymbol{e}))$ $I_v \leftarrow \mathsf{DecompIdx.Step1}(\mathtt{ctxt}(\boldsymbol{w}))$ $\mathsf{sparse}(\boldsymbol{d}) \leftarrow \mathsf{Reconst}(\boldsymbol{e}, I_v)$

Step 2: Reconstruct $\boldsymbol{d}$ from sparse($\boldsymbol{d}$).

▷ redundant step for formatting $\boldsymbol{d} \leftarrow (d_1, \cdots, d_N)$, where $d_i = \begin{cases} x, & \text{if } (i, x) \in \mathsf{sparse}(\boldsymbol{d}) \\ 0, & \text{otherwise.} \end{cases}$ return $\boldsymbol{d}$

ELECTRONIC DEVICE AND SERVER DEVICE RESPONDING TO ENCRYPTED QUERY AND METHODS THEREOF

CROSS REFERENCE TO PRIOR APPLICATIONS

This application claims priority to and the benefit Korean Patent Application No. 10-2023-0144213 and 10-2024-0127246 filed on Oct. 25, 2023, and Sep. 20, 2024, which are hereby incorporated by reference in their entirety.

BACKGROUND

1. Field

The present disclosure relates to an electronic device and a server device responding to a query and methods thereof, and more particularly, to an electronic device and a server device providing data corresponding to a homomorphic encrypted query and methods thereof.

2. Description of Related Art

With the development of electronic technology and networks, various electronic devices with communication functions, including smartphones, are being used. Users may search for and use various data using their electronic devices.

For example, users of smartphones may access websites of various organizations and search for data they want. In this case, it is common for users to input queries to search for data.

However, in the process of users inadvertently inputting queries, there are cases where personal information of users are provided to the server device while being included in the queries. Accordingly, there is a problem in that the personal information of the users may leak.

SUMMARY

The present disclosure provides an electronic device and a server device capable of efficiently searching for data corresponding to a homomorphic encrypted query and responding to the query, and methods thereof.

According to an aspect of the present disclosure, a server device includes a communication unit configured to perform communication with an external device, a memory configured to store a database including a plurality of keys and data corresponding to each key, and a processor.

When the homomorphic encrypted query is received from the external device through the communication unit, the processor is configured to acquire an index vector indicating at least one key matching the query by calculating each of the plurality of keys of the database and the query, mask data of each key of the database to the index vector to acquire a data vector including data corresponding to the at least one key, and compress each of the index vector and the data vector, and transmit the compressed index data and data vector to the external device through the communication unit.

The memory may store a matrix for compression, and the processor may be configured to compress the index vector by multiplying the index vector by the matrix and compress the data vector by multiplying the data vector by the matrix.

According to another aspect of the present disclosure, an electronic device includes a communication unit configured to perform communication with a server device, a memory, and a processor, in which the processor may be configured to generate a public key and a secret key for homomorphic encryption and store the generated public key and secret key in the memory, when a query is input, homomorphically encrypt the query using the public key to generate a homomorphic encrypted message, and transmit the homomorphic encrypted message to the server device through the communication unit, receive, through the communication unit, compressed index data that compresses an index vector indicating at least one key matching the homomorphic encrypted message from the server device and compressed data that compresses a data vector corresponding to the at least one key, and decrypt the compressed index data using the secret key to acquire the index vector, and obtain data corresponding to the at least one key from the compressed data based on the index vector.

The memory may store a matrix for decompression, and the processor may be configured to decrypt the compressed index data to acquire the index vector, combine values corresponding to the index vector in the matrix to acquire a transformation matrix, and multiply an inverse matrix of the transformation matrix by the compressed data to acquire data corresponding to the at least one key.

According to still another aspect of the present disclosure, a query response method of a server device includes, when a homomorphic encrypted query is received from an external device, calculating the query with each of a plurality of keys in a pre-stored database to acquire an index vector indicating at least one key matching the query, masking data of each key of the database to the index vector to acquire a data vector including data corresponding to the at least one key, compressing each of the index vector and the data vector, and transmitting the compressed data to the external device.

The compressing of each of the index vector and the data vector may include compressing the index vector by multiplying the index vector by a preset matrix, and compressing the data vector by multiplying the data vector by the matrix.

According to yet another aspect of the present disclosure, a query response method of an electronic device includes generating and storing a public key and a secret key for homomorphic encryption, when a query is input, homomorphically encrypting the query using the public key to generate a homomorphic encrypted message, transmitting the homomorphic encrypted message to a server device, receiving compressed index data that compresses an index vector indicating at least one key matching the homomorphic encrypted message from the server device and compressed data that compresses a data vector corresponding to the at least one key, decrypting the compressed index data using the secret key to acquire the index vector, and acquiring data corresponding to the at least one key from the compressed data based on the index vector.

The acquiring of the data corresponding to the at least one key may include multiplying the compressed data by an inverse matrix of a transformation matrix transformed by combining values corresponding to the index vector in a pre-stored matrix to acquire the data corresponding to the at least one key.

According to various embodiments of the present disclosure, by processing the queries and their corresponding data in the homomorphic encrypted state, it is possible to enhance the data security, reduce the computational burden, and increase the response speed.

BRIEF DESCRIPTION OF THE DRAWINGS above and other aspects, features and advantages of characteristic embodiments of the present disclosure will become more apparent from the following description in conjunction with the accompanying drawings:

FIGS. 11 to 13 are diagrams illustrating an example of an algorithm for processing a compressed index and compressed data.

DETAILED DESCRIPTION

Encryption/decryption may be applied to an information (data) transmission process performed in the present disclosure if necessary, and all expressions describing the information (data) transmission process in the present disclosure and claims should be interpreted as including cases of encryption/decryption even if not separately stated. In the present disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the present disclosure, the term "include" has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, "value" is defined as a concept including a vector as well as a scalar value.

Mathematical operations and calculations of each step of the present disclosure to be described below may be implemented as computer calculations by the known coding method and/or coding designed to suit the present disclosure in order to perform the corresponding operations or calculations.

Specific equations to be described below are illustratively described among possible alternatives, and the scope of the present disclosure should not be construed as being limited to equations mentioned in the present disclosure.

For convenience of description, in the present disclosure, a notation is defined as follows.

$a \leftarrow D$: select element (a) according to distribution (D)

$s_1, s_2 \in R$: Each of $s_1$ and $s_2$ is an element belonging to set R.

mod(q): Modular operation with element q $\lfloor \bullet \rceil$: Round-off internal value Hereinafter, various embodiments of the present disclosure will be described in detail with reference to the accompanying drawings.

Figure 1:
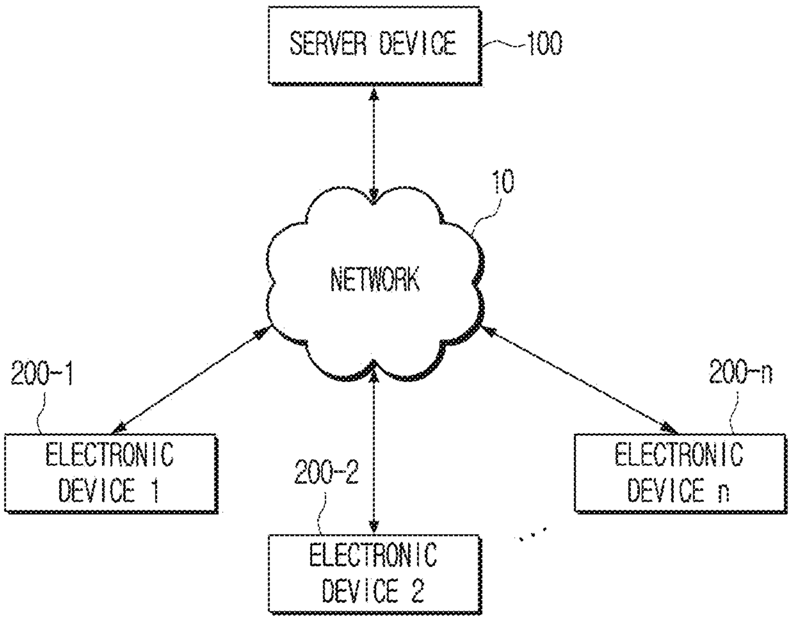
FIG. 1 is a diagram for describing a query response method according to at least one embodiment of the present disclosure.

FIG. 1 is a diagram for describing a password generation method according to at least one embodiment of the present disclosure. Referring to FIG. 1, a server device 100 and a plurality of electronic devices 200-1 to **200-*n* may be connected to each other through a network 10**.

The network 10 may be implemented as various types of wired/wireless communication networks, broadcast communication networks, optical communication networks, cloud networks, etc. In FIG. 1, each device 100 and 200-1 to **200-*n* is indirectly connected to each other through the network 10**, but is not limited thereto, and each device may be connected in a method such as Wi-Fi, Bluetooth, and near field communication (NFC) without a separate medium.

In FIG. 1, the server device 100 is an electronic device for providing a response to a query transmitted from each of the electronic devices 200-1 to **200-*n*. The server device 100 may be implemented as a single electronic device or as a cloud server. In addition, the server device 100 may be implemented as a web server accessible through the network 10 such as the Internet. In FIG. 1, the server device 100 is described to be distinguished from the electronic device 200-1 to 200-*n*, but the server device 100 may also be described as an electronic device. In this case, other electronic devices 200-1 to 200-*n*** may be described as external devices.

The electronic devices 200-1 to **200-*n* may be various terminal devices used by various users. Specifically, the electronic devices 200-1 to 200-*n*** may be implemented in various forms such as a PC, a laptop PC, a mobile phone, a tablet PC, a kiosk, a TV, a home server, an electronic device equipped with other IoT functions, a game player, etc.

A user may access the server device 100 using the electronic device (e.g., 200-1) he or she uses and transmit a query. In this disclosure, the query may be a message that includes an arbitrary question that requires a response. The query may be described as a request, an inquiry, a question, etc., but is unified as a query in this disclosure.

Each electronic device 200-1 to **200-*n* may be described as a client device, a user terminal device, etc. The user may request necessary data from among data held by the server device 100 or accessible from the server device 100 through the query. Specifically, when the server device 100** has a database that includes personal information of residents in a specific administrative district, the user may input the query requesting the personal information. For example, the user may input a query requesting a name and address, etc., of a man who is the same age as the user.

When such a query is input through one (hereinafter referred to as 200) of the electronic devices, the electronic device 200 transmits the input query to the server device 100 through the network 10. In this case, when the query is transmitted in plain text, there is a possibility that the contents of the query will be disclosed when the query is hacked by a third party during the transmission process or exposed to an administrator of the server device 100, etc. Therefore, according to various embodiments of the present disclosure, the electronic device 200 transmits the query in the form of a homomorphic encrypted message by homomorphically encrypting the query.

When the server device 100 receives a homomorphic encrypted query from the external device, i.e., the electronic device 200, it acquires data matching the query from among the data described in a pre-stored database and then transmits the data to the electronic device 200. Since the query itself is in a homomorphic encrypted message state, the data matching the query is also transmitted in the form of the homomorphic encrypted message. That is, since a matching operation is performed in the homomorphic encrypted message state, even if the administrator of the server device 100 checks the query and its matching data, he/she may not know the actual contents of the query or the contents of the response thereto. In addition, even if a third party hacks during the data transmission process, the contents of the query or the response contents may not be known. Therefore, it is possible to greatly improve security.

Meanwhile, the server device 100 does not transmit data matching the query as it is, but compresses and then transmits the data. Accordingly, it is possible to increase data transmission efficiency and reduce computational burden.

Figure 2:
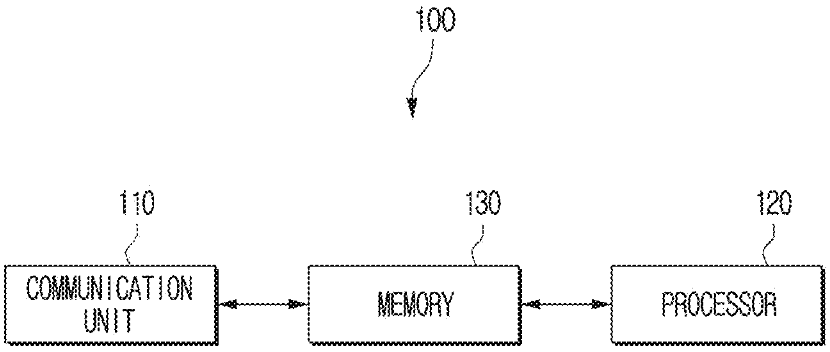
FIG. 2 is a block diagram illustrating a configuration of a server device according to at least one embodiment of the present disclosure.

FIG. 2 is a block diagram illustrating a configuration of a server device according to at least one embodiment of the present disclosure. Referring to FIG. 2, the server device 100 includes a communication unit 110, a memory 120, and a processor 130.

The communication unit 110 is configured to perform communication with various external devices including the electronic devices 200-1 to 200-*n*. The communication unit 110 may transmit and receive various signals and data to and from external devices through various wired and wireless communication methods such as a wired/wireless local area network (LAN), a wide area network (WAN), Ethernet, IEEE 1394, Bluetooth, an AP-based wireless LAN network (Wi-Fi), Zigbee, a high-definition multimedia interface (HDMI), a universal serial bus (USB), a mobile high-definition link (MHL), audio engineering society/European broadcasting union (AES/EBU), optical, coaxial, etc. For example, the communication unit 110 may receive queries from each electronic device 200-1 to 200-*n* of FIG. 1.

The memory 120 is configured to store various programs, data, instructions, etc., required for the operation of the server device 100. The memory 120 may be implemented as at least one of various memories such as a RAM (dynamic RAM), a static RAM (SRAM), a synchronous dynamic RAM (SDRAM), a one time programmable read only memory (OTPROM), a programmable ROM (PROM), an erasable and programmable ROM (EPROM), an electrically erasable and programmable ROM (EEPROM), a mask ROM, a flash ROM, a flash memory, and a hard drive, and a solid state drive (SSD).

The memory 120 may store a database including data that serves as a basis for responding to various queries. The database may include a plurality of keys for distinguishing data and data corresponding to each key. The key may also be referred to as an index. The database may be implemented in various types. For example, data on financial transaction records, medical records, criminal records, various personal information, academic background, bank transaction information, balance, tax-related information, etc., may be recorded. The present disclosure describes a case where the database is directly stored in the memory 120, but is not limited thereto, and the database may be stored in an external device other than the server device 100.

The processor 130 is a component for controlling the overall operation of the server device 100. The processor 130 may perform various operations based on instructions, programs, data, etc., stored in the memory 120.

The processor 130 may be implemented as a digital signal processor (DSP) or a microprocessor that processes a digital signal. However, the processor 130 is not limited thereto, but may include one or more of a central processing unit (CPU), a micro controller unit (MCU), a micro processing unit (MPU), a controller, an application processor (AP), a communication processor (CP), or an ARM processor, or an artificial intelligence (AI) processor, or may be defined by these terms. In addition, the processor 130 may be implemented by a system-on-chip (SoC) or a large scale integration (LSI) in which a processing algorithm is embedded, or may be implemented in a field programmable gate array (FPGA) form. The processor 130 may perform various functions by executing computer executable instructions stored in the memory 120.

Specifically, when the homomorphic encrypted query is received from an external device through the communication unit 110, the processor 130 performs a matching operation to search for data matching a query by comparing the data with data recorded in the database. In the present disclosure, the matching operation means an operation of homomorphically checking whether each record of the database satisfies a specific condition for acquiring an encrypted sparse index vector mi (where mi∈{o.1}). The processor 130 may perform the matching operation by performing an operation between each key of the database and the query using an operation key provided by the electronic device 200. In this case, the result of the matching operation is output as a homomorphic encrypted value of 0 or 1. The result of the matching operation in the present disclosure may be referred to as an index vector. The index vector is information indicating at least one key matching the query.

When the index vector is obtained, the processor 130 masks the data of each key of the database to the index vector to acquire a data vector including data corresponding to at least one key among the index vectors, i.e., a key having a value of 1. In the present disclosure, the masking may be an operation of replacing a value of 1 indicating a meaningful item in the index vector with actual data. For example, the processor 130 may perform the masking by multiplying data corresponding to each key in the database by each index value. When the index value is 0, the multiplication result value becomes 0, and when the index value is 1, the multiplication result value becomes actual data.

The processor 130 compresses each of the index vector and the data vector. The compressed data is used as a response to the query. That is, the processor 130 transmits the compressed data to the electronic device 200 through the communication unit 110.

Figure 3:
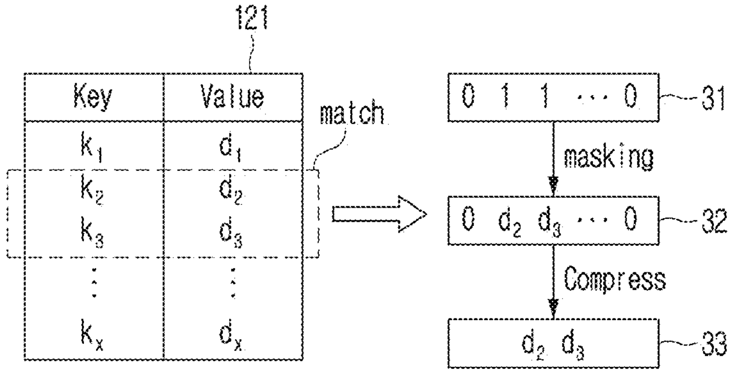
FIG. 3 is a diagram for describing a process of detecting and compressing data from a database.

FIG. 3 is a diagram for describing a response process according to at least one embodiment of the present disclosure. This response process is a process of generating a response to a query in a homomorphic encrypted state, and therefore, may also be called a private database query scheme (PDQ).

Referring to FIG. 3, a plurality of keys k1 to kx and data d1 to dx corresponding to each key are recorded in a database 121. When the query is received, the processor 130 performs a matching operation for the received query and each key to acquire an index vector 31 matching the query. Assuming that only k2 and k3 are matched among all keys in FIG. 3, the index vector 31 becomes 0, 1, 1, 0, . . . , 0.

In this state, the processor 130 performs a masking operation to acquire data vector 32. The data vector 32 of FIG. 3 becomes 0, d2, d3, . . . , 0.

The processor 130 compresses the acquired data vector 32 to acquire compressed data 33. The compressed data 33 of FIG. 3 becomes d2 and d3 excluding part 0. The compression may be performed in various ways, but various embodiments of the present disclosure describe a compression and decompression method using a matrix. Specifically, the compression and decompression may be performed by performing homomorphic matrix-vector multiplication. Specific compression and decompression methods will be described in detail again in the following sections.

Figure 4:
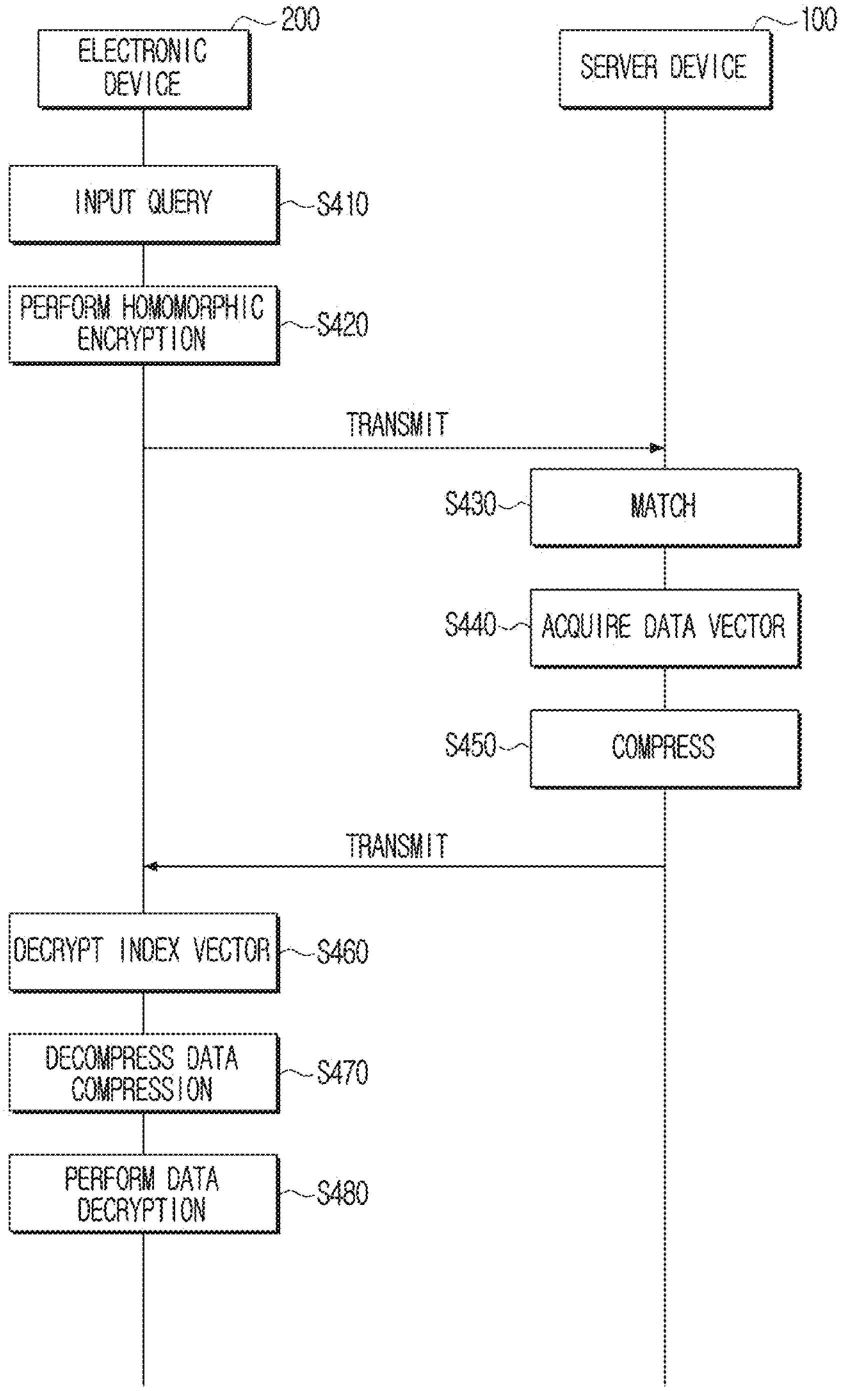
FIG. 4 is a timing diagram for sequentially describing operations of an electronic device and a server device for receiving a query and providing a response thereto.

FIG. 4 is a timing diagram sequentially describing the operations of the electronic device and the server device for performing the query response. Referring to FIG. 4, when a query is input (S410), the electronic device 200 homomorphically encrypts the query (S420) and transmits the homomorphic encrypted message. For the homomorphic encryption, the electronic device 200 may generate a public key and a secret key. In addition, various operation keys for performing operations may be generated using the homomorphic encrypted message. The operation key may be provided to the server device 100 together with the homomorphic encrypted message. Accordingly, the operation key may be used for the above-described matching operation.

The query to be transmitted may be input to the electronic device 200 in various ways. Specifically, when the electronic device 200 includes a touch screen, a button, a microphone, etc., a user may directly input various queries using these input means. Alternatively, the electronic device 200 may receive queries through a keyboard, a mouse, a microphone, etc., connected through an interface such as HDMI or USB.

For example, a query, etc., requesting to search for financial information of people with "family_name=Smith" may be input. The electronic device 200 may homomorphically encrypt the entire query, but may also partially homomorphically encrypt only important parts of the entire query. That is, in the above example, only the "family_name=Smith" part may be homomorphically encrypted, and the part "search for financial information" may be transmitted as the plain text itself.

The server device 100 performs the matching operation of comparing the received query with each key of the database (S430). Accordingly, the index vector including at least one key matching the query is acquired. For example, assuming that the key of the database is organized as the family_name, the result of calculating a query with the family-name Smith is obtained as 1, and the result of calculating the remaining keys and queries is obtained as 0.

The server device 100 applies data for each key of the database to acquire the data vector (S440). That is, the server device 100 may acquire the data vector by performing the masking operation.

In this state, the server device 100 compresses the index vector and the data vector, respectively (S450) and then transmits the compressed index data and data vector to the electronic device. The compressed data maintain the homomorphic encrypted state.

The electronic device 200 decrypts the compressed index data using the secret key that has been previously generated and stored to acquire the index vector (S460). Referring to the index vector, the electronic device 200 may identify an index in which the data corresponding to the query is recorded among all the indexes. That is, the electronic device 200 decompresses the data using the index vector (S470) and decrypts the data using the secret key to acquire the response (S480).

When the electronic device 200 includes a display, it may display the acquired response. When the query is to search for financial information of people whose family_name=Smith as in the example described above, the response may be financial information of all Smiths.

A matrix may be used for data compression and decompression.

Figure 5:
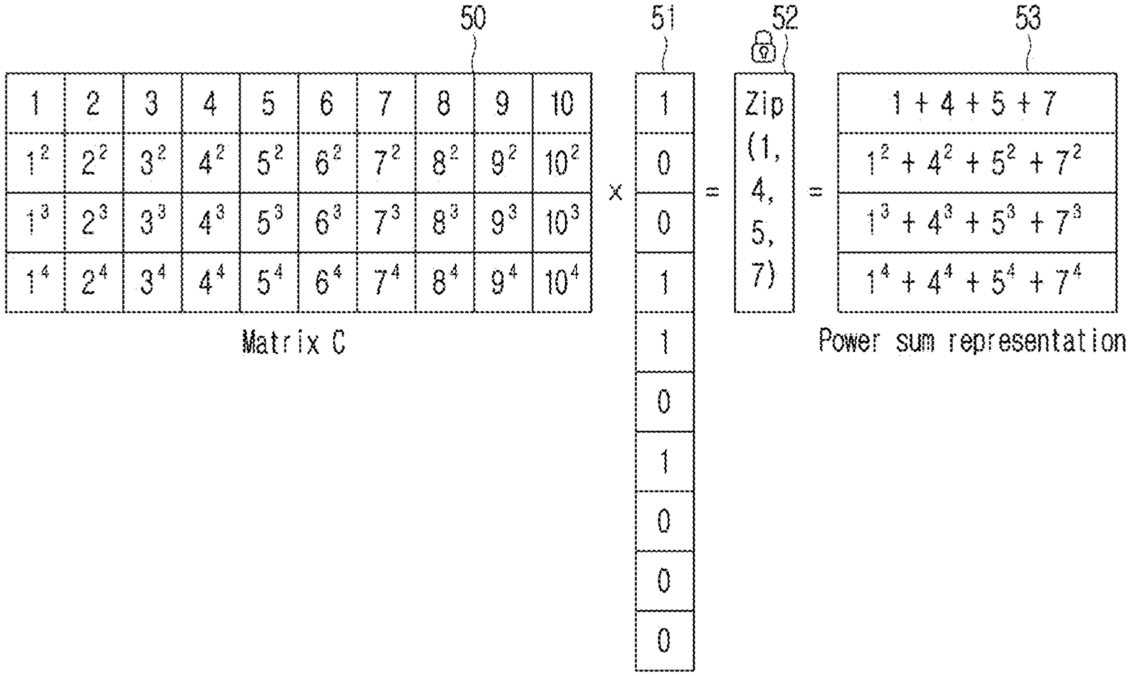
FIG. 5 is a diagram for describing a method of compressing an index vector.
Figure 6:
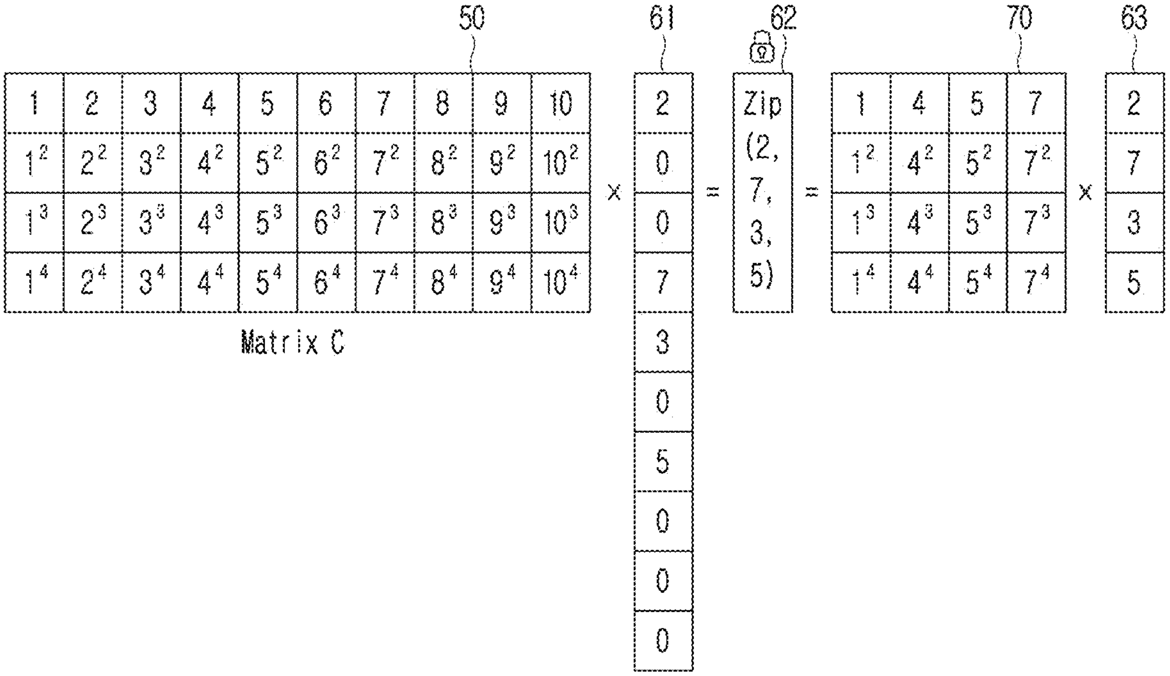
FIG. 6 is a diagram for describing a method of compressing a data vector.

FIG. 5 illustrates an example of a method for compressing an index vector. The memory 120 of the server device 100 may store a matrix 50. The matrix 50 may be designed for compression and decompression. For example, a matrix having n rows and m columns and whose element values are $m^n$ may be used. In the present disclosure, such a matrix is called a Vandermonde-like matrix. In FIGS. 5 and 6, the matrix 50 composed of 4 rows and 10 columns is disclosed, but the number of rows and columns may change variously depending on the database.

In FIG. 5, the processor 130 may obtain a compressed index data 52 by multiplying the matrix 50 by an index vector 51. Since positions of 1 in the index vector 51 are 1, 4, 5, and 7, the compressed index data 52 may be expressed as a power sum such as 1+4+5+7, $1^2+4^2+5^2+7^2$, $1^3+4^3+5^3+7^3$, $1^4+4^4+5^4+7^4$.

FIG. 6 illustrates an example of a method of compressing a data vector. The processor 130 may also compress a data vector 61 by multiplying the data vector 61 by the same matrix 50. A compressed data vector 62 may be expressed in the form of multiplying a compression matrix 70 including only columns corresponding to the index value 1 by a 1-column matrix 63 including only data of columns corresponding to the index value 1.

The processor 130 transmits the compressed index data 52 and the compressed data 62 to the electronic device 200 through the communication unit 110, respectively.

Figure 7:
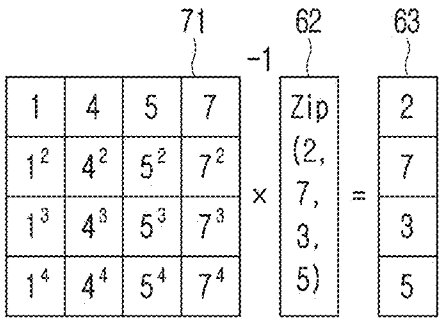
FIG. 7 is a diagram for describing a method of decompressing compressed data to acquire data.

FIG. 7 illustrates an example of a method of decompressing the compressed data 62 in the electronic device 200. The electronic device 200 decrypts the compressed index data 52 using the secret key to acquire the index vector 51. This will be described in detail again in the following section.

The electronic device 200 acquires a transformation matrix by combining matrix values of first, fourth, sixth, and seventh columns corresponding to the index vector, i.e., the index value 1, in the pre-stored matrix 50. The transformation matrix is identical to the compression matrix 70 of FIG. 6. The electronic device 200 generates an inverse matrix 71 of the transformation matrix, and then multiplies the inverse matrix 71 by the compressed data vector 62. Accordingly, the compression matrix 70 is removed from the compressed data vector 62 of FIG. 6, and only the data part 63 remains.

Figure 8:
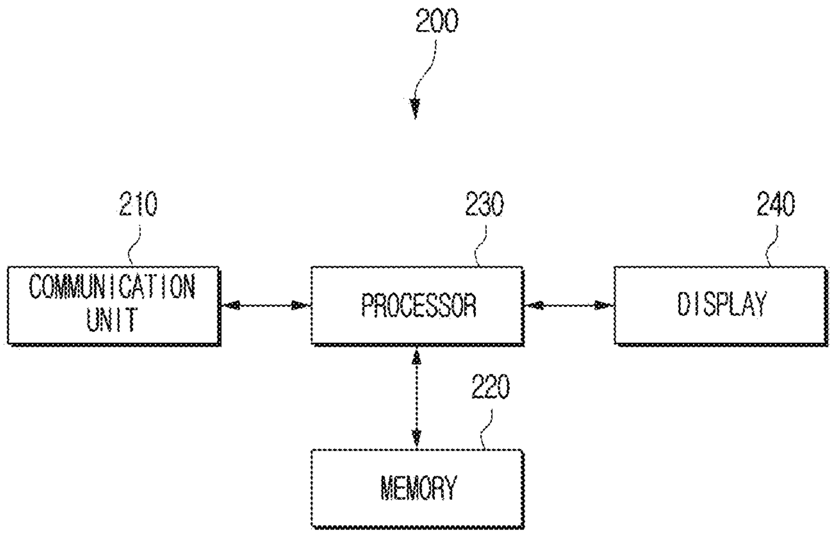
FIG. 8 is a block diagram illustrating a configuration of the electronic device according to at least one embodiment of the disclosure.

FIG. 8 is a block diagram illustrating a configuration of the electronic device according to at least one embodiment of the disclosure; Referring to FIG. 8, the electronic device 200 includes a communication unit 210, a memory 220, a processor 230, and a display 240.

The communication unit 210 is configured to perform communication with various external devices including the server device 100 and the network 10.

The memory 220 is configured to store matrices or other data, programs, instructions, etc., required for decompression. The memory 220 may also store the public key, the secret key, the operation key, etc., for homomorphic encryption.

The processor 230 is configured to perform various operations based on data, programs, instructions, etc., stored in the memory 220. The communication unit 210, the memory 220, and the processor 230 may be implemented in various examples as described in FIG. 2, but a redundant description thereof will be omitted.

The processor 230 may generate the public key, the secret key, the operation key, etc., for homomorphic encryption and store the generated public key, secret key, operation key, etc., in the memory 220.

The public key is a key used to generate the homomorphic encrypted message, and the secret key is a key used to decrypt the homomorphic encrypted message. The operation key is a key used for various operations (evaluation or computation) based on the homomorphic encrypted message. Specifically, the operation key may include a relinearization key (rlk), a rotation key (rotKey), etc. The relinearization key may be used for a multiplication operation, and the rotation key may be used for a rotation operation.

For example, the processor 230 may generate a public key using a ring-LWE technique. Describing specifically, the processor 230 may first set various parameters and rings and store the parameters and rings in the memory 220. Examples of the parameters may include lengths of plain text message bits, sizes of public and secret keys, and the like.

The ring may be expressed by the following Equation.

$$R = Z_q[X]/f(x) \quad \text{[Equation 1]}$$

Here, R denotes a ring, $Z_q$ denotes a coefficient, and f(x) denotes an n-th polynomial.

The ring is a set of polynomials having predetermined coefficients, and means a set in which addition and multiplication are defined between elements and which is closed for addition and multiplication.

For example, the ring R means a set of n-th polynomials having a coefficient Zq. Specifically, when n is Φ(N), it refers to polynomials that may be calculated as the remainder of dividing the polynomial by an N-th cyclotomic polynomial.

In Equation 1, f(x) denotes ideal of $Z_q[x]$ generated by the f(x). The Euler totient function Φ(N) means the number of natural numbers that is coprime to N and smaller than N. When $\Phi_N(x)$ is defined as an N-th cyclotomic polynomial, the ring may also be expressed by Equation 2 as follows.

$$R = Z_q[X]/\Phi_N(x) \quad \text{[Equation 2]}$$

Meanwhile, the ring R of the above-described Equation 2 may have binary data in the plain text space. When such a ring is set, the processor 230 may calculate the secret key sk from the ring. The secret key sk may be expressed as follows.

$$sk \leftarrow (1, s(x)), s(x) \in R \quad \text{[Equation 3]}$$

Here, s(x) means a polynomial generated randomly with small coefficients.

The processor 230 calculates a first random polynomial a(x) from the ring. The first random polynomial may be expressed as follows.

$$a(x) \leftarrow R \quad \text{[Equation 4]}$$

In addition, the processor 230 may calculate an error. Specifically, the processor 230 may extract an error from a discrete Gaussian distribution or a distribution statistically close to the discrete Gaussian distribution. This error may be expressed as follows.

$$e(x) \leftarrow D^n_{\alpha q} \quad \text{[Equation 5]}$$

When the error is calculated, the processor 230 may calculate a second random polynomial by performing a modular operation on the error in the first random polynomial and the secret key. The second random polynomial may be expressed as follows.

$$b(x) = -a(x)s(x) + e(x)(\text{mod } q) \quad \text{[Equation 6]}$$

Finally, a public key pk is set as follows in a form including the first random polynomial and the second random polynomial.

$$pk = (b(x), a(x)) \quad \text{[Equation 7]}$$

Since the above-described key generation method is only an example, it is not necessarily limited thereto, and it goes without saying that the processor 230 may be generated by other methods.

The processor 230 may store information on keys generated for homomorphic encryption in the memory 220. When the query is input, the processor 230 uses the public key among the stored keys to homomorphically encrypt the query to generate the homomorphic encrypted message.

The query may be input in various ways depending on the type of the electronic device 200. For example, when the electronic device 200 is a smartphone and the display 240 is a touch screen, the user may input the query using a soft keyboard displayed on the display 240. Alternatively, when the electronic device 200 is equipped with a USB port or other connection interfaces for wired connection with an external device, the query input from the external device connected through the interface may be transmitted to the electronic device 200 through the interface. Alternatively, when the electronic device 200 has a built-in microphone or is connected to a microphone through the interface, it may analyze the user's voice input through the microphone to identify whether the user's voice is the query. The processor 230 may store the input query in the memory 220 and then homomorphically encrypt the input query as described above.

When the homomorphic encryption is performed, the processor 230 transmits the homomorphic encrypted message, i.e., the query, to the server device 100 through the communication unit 210. Accordingly, the server device 100 may generate and transmit the compressed index data and compressed data as described above.

When the processor 230 receives the compressed index data and the compressed data through the communication unit 210, the processor 230 first decrypts the compressed index data among the compressed index data and the compressed data using the secret key to acquire the index vector. Thereafter, the processor 230 acquires data corresponding to at least one key from the compressed data based on the index vector. The processor 230 may also decrypt the acquired data using the secret key to acquire the response to the query. The processor 230 may control the display 240 to display a screen including the query and the response thereto.

In FIG. 8, the electronic device 200 including the display 240 is illustrated, but when the electronic device 200 is implemented as a PC, etc., the display 240 may also be an external device connected through the interface.

Figure 9:
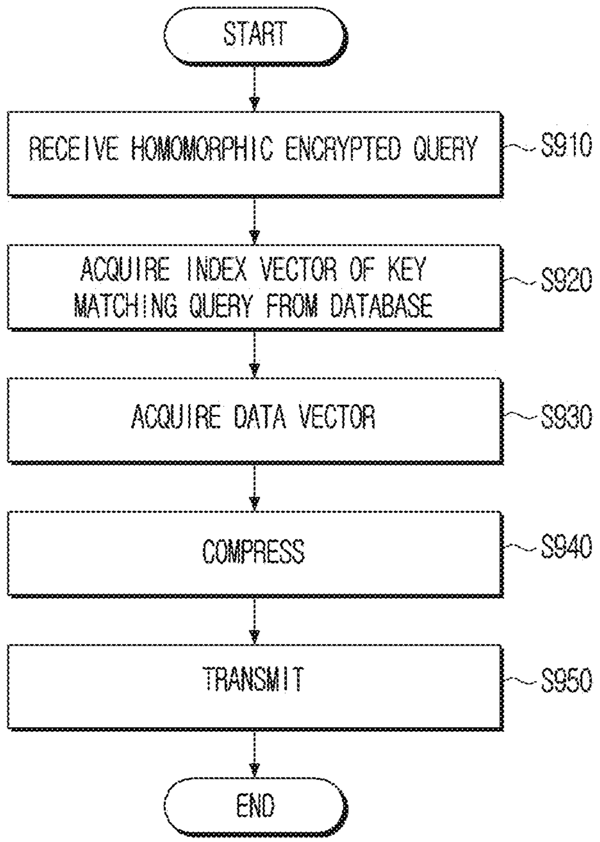
FIG. 9 is a flowchart for describing a query response method of the server device according to at least one embodiment of the present disclosure.

FIG. 9 is a flowchart for describing a query response method of the server device according to at least one embodiment of the present disclosure; Referring to FIG. 9, when a homomorphic encrypted query is received (S910), the server device acquires an index vector of a key matching the query from the database (S920). Specifically, the server device may acquire the index vector by performing the matching operation that calculates each key of the database and the query using the operation key received together with the query described above.

Thereafter, the server device performs the masking operation to acquire the data vector (S930). The matching operation and the masking operation have been specifically described in the above-described section, and therefore, a redundant description thereof will be omitted.

The server device compresses the index vector and the data vector respectively (S940) to acquire the compressed index data and the compressed data respectively. Since the compression method has been described in FIGS. 5 and 6, a redundant description thereof will be omitted. The server device may transmit the compressed data to the electronic device (S950). Since the data is searched by performing operations with each data of the database in a homomorphic encrypted state, both the searched data vector and the index vector are encrypted, and the compressed data is also encrypted. Therefore, even the administrator of the server device is not able to know the contents of the query and the contents of the response thereto, and even if the query or response is hacked by a third party during the transmission and reception process, the third party will not be able to know the contents. In addition, since the data is transmitted in the compressed state, the burden of data transmission and reception is greatly reduced.

Figure 10:
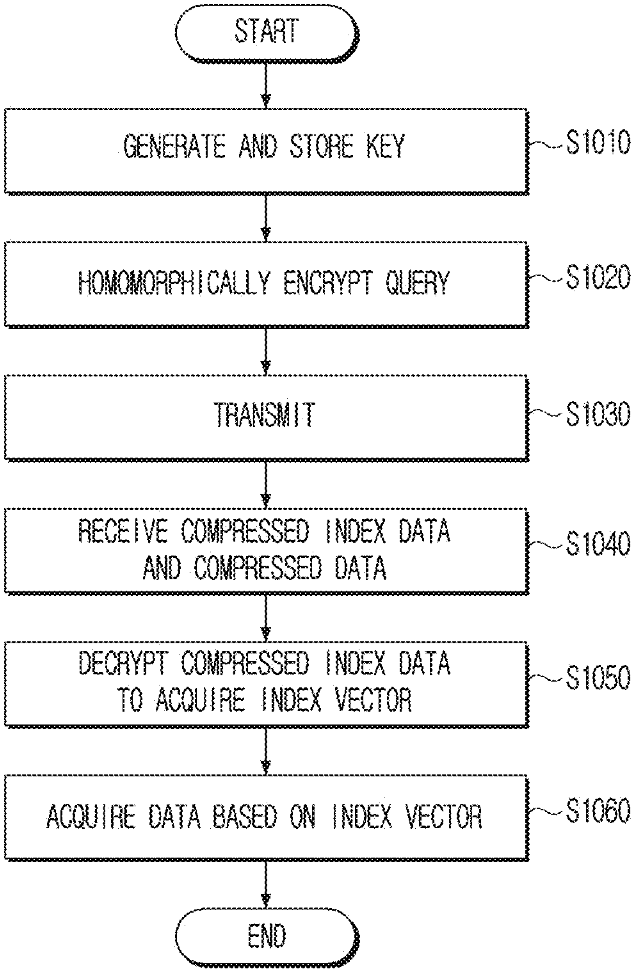
FIG. 10 is a flowchart for describing a query response method of the electronic device according to at least one embodiment of the present disclosure.

FIG. 10 is a flowchart for describing a query response method of the electronic device according to at least one embodiment of the present disclosure. Referring to FIG. 10, the electronic device generates and stores a public key for homomorphic encryption, a secret key, an operation key for operation, or the like (S1010).

When the query is input, the electronic device homomorphically encrypts at least a part of the query using the public key to acquire the homomorphic encrypted message (S1020).

The electronic device transmits the acquired homomorphic encrypted message to the server device (S1030). Thereafter, when the server device compresses and transmits the index vector and the data vector according to the method described above, the electronic device receives the compressed and transmitted index vector and data vector (S1040).

The electronic device decrypts the compressed index data using the secret key to acquire the index vector (S1050). Newton's Identity may be used to acquire the index vector.

Specifically, let R be a ring, and for $0 \le k \le n$, a k-th elementary symmetric polynomial $e_k$ of $R[X_1, \ldots, X_n]$ may be expressed by the following Equation.

$$e_0 = 1,\quad e_1 = \sum_{1 \le i \le n} X_i,\quad e_2 = \sum_{1 \le i < j \le n} X_i X_j,\quad \vdots \quad e_n = X_1 X_2 \ldots X_n. \qquad \text{[Equation 8]}$$

Also, the Newton's identity may be expressed as follows.

$$k \cdot e_k = \sum_{i=1}^{k} (-1)^{i-1} e_{k-i} \cdot p_i \qquad \text{[Equation 9]}$$

Specifically, the decompression of the compressed index may be performed according to an algorithm such as FIG. 11.

In FIG. 11, ctxt(w) denotes the compressed index, and v denotes the index vector. Referring to step 1 and step 2 of FIG. 11, it can be seen that the encrypted compressed index ctxt(w) is decrypted to acquire w, and then decompressed to acquire the index vector v. In FIG. 11, $I_v$ (where $I \in I_v$) denotes an index set of the index vector v.

In step 1 of FIG. 11, the process of acquiring $I_v$ from w may be performed by an algorithm such as FIG. 12. In FIG. 12, $Z_P$ denotes a message space in an HE scheme. Referring to FIG. 12, it can be seen that the index vector is acquired using the Newton's identity.

Thereafter, the values corresponding to the index vectors in the pre-stored matrix are combined to acquire the transformation matrix, and a zero matrix of the transformation matrix is multiplied by the compressed data to acquire the data corresponding to the query (S1060). FIG. 13 is an algorithm for describing a method of decompressing compressed data.

In FIG. 13, ctxt(x) denotes the encrypted query, ctxt(w) denotes the compressed index, and ctxt(e) denotes the compressed data. Referring to FIG. 13, when the compressed index and the compressed data are received, the compressed data is decrypted to acquire e, and the compressed index is processed to acquire the index vector. The method of obtaining an index vector has already been described in the above-described section. Accordingly, a data vector d is reconstructed from the compressed data, i.e., sparse(d). The above description may be equally applied to other embodiments described above.

The electronic device may display, through the display, the query and the corresponding data, i.e., the response, by configuring the query and data in the form of a screen.

The query response method described in FIGS. 9 and 10 may be performed by the server device and the electronic device having the configurations illustrated in FIGS. 2 and 8, respectively, but is not necessarily limited thereto, and may be performed by another type of device in which some configurations are added, omitted, or modified.

Each of the embodiments described above may be implemented as an embodiment alone, but is not necessarily limited thereto, and may be implemented together in all or in part by being combined with at least one other embodiment.

In addition, the query response method according to various embodiments of the present disclosure may be performed in various devices, and a program for performing such a method may be distributed in a state stored on a non-transitory readable recording medium.

Here, the term 'non-transitory' in the non-transitory readable recording medium means that the storage medium is tangible without including a signal, and does not distinguish whether data are semi-permanently or temporarily stored in the storage medium.

In addition, the methods according to various embodiments disclosed above may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store. In a case of the online distribution, at least portions of the computer program product may be at least temporarily stored in a storage medium such as a memory of a manufacturer server, an application store server, or a relay server or be temporarily created.

Each of the components (for example, modules or programs) according to various embodiments described above may include a single entity or a plurality of entities, and some of the corresponding sub-components described above may be omitted or other sub-components may be further included in various embodiments. Alternatively or additionally, some of the components (e.g., the modules or the programs) may be integrated into one entity, and may perform functions performed by the respective corresponding components before being integrated in the same or similar manner. Operations performed by the modules, the programs, or the other components according to various embodiments may be executed in a sequential manner, a parallel manner, an iterative manner, or a heuristic manner, at least some of the operations may be performed in a different order or be omitted, or other operations may be added.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A server device, comprising:

a communication unit configured to perform communication with an external device;

a memory configured to store a matrix for compression and a database including a plurality of keys and data corresponding to each key; and a processor, wherein the processor configured to:

based on a homomorphic encrypted query is received from the external device through the communication unit, acquire an index vector indicating at least one key matching the homomorphic encrypted query by performing a matching operation to search for data matching the homomorphic encrypted query by homomorphically checking whether each of the plurality of keys of the database satisfies a specific condition with the homomorphic encrypted query, acquire a data vector including data corresponding to the at least one key among the plurality of keys by masking data corresponding to each key of the database with the index vector, the masking comprising multiplying, for each key, the data corresponding to the key by a corresponding index value of the index vector, compress the index vector by multiplying the index vector by the matrix, compress the data vector by multiplying the data vector by the matrix, and transmit the compressed index vector and the compressed data vector to the external device through the communication unit.

2. An electronic device, comprising:

a communication unit configured to perform communication with a server device;

a memory; and a processor, wherein the processor is configured to:

generate a public key and a secret key for homomorphic encryption and store the generated public key and secret key in the memory, based on a query as input, generate a homomorphic ciphertext by homomorphically encrypting the query using the public key, transmit the homomorphic ciphertext corresponding to the query to the server device through the communication unit, receive, through the communication unit, compressed index data that compresses an index vector indicating at least one key matching the homomorphic ciphertext from the server device and compressed data that compresses a data vector including data corresponding to the at least one key, and decrypt the compressed index data using the secret key to acquire the index vector, and obtain the data corresponding to the at least one key from the compressed data based on the index vector, wherein the memory stores a pre-stored matrix for compression and decompression, and the processor is further configured to:

acquire a transformation matrix by combining values corresponding to the index vector in the pre-stored matrix, and acquire the data corresponding to the at least one key by multiplying an inverse matrix of the transformation matrix by the compressed data.

3. A query response method of a server device, comprising:

based on a homomorphic encrypted query is received from an external device, acquiring an index vector indicating at least one key matching the homomorphic encrypted query by performing a matching operation to search for data matching the homomorphic encrypted query by homomorphically checking whether each of a plurality of keys in a pre-stored database satisfies a specific condition with the homomorphic encrypted query;

acquiring a data vector including data corresponding to the at least one key among the plurality of keys by masking data corresponding to each key of the pre-stored database to the index vector, the masking comprising multiplying, for each key, the data corresponding to the key by a corresponding index value of the index vector;

compressing the index vector by multiplying the index vector by a preset matrix; compressing the data vector by multiplying the data vector by the preset matrix; and transmitting the compressed index vector and the compressed data vector to the external device.

4. A query response method of an electronic device, comprising:

generating and storing a public key and a secret key for homomorphic encryption;

based on a query as input, homomorphically encrypting the query using the public key to generate a homomorphic ciphertext;

transmitting the homomorphic ciphertext corresponding to the query to a server device;

receiving compressed index data that compresses an index vector indicating at least one key matching the homomorphic ciphertext from the server device and compressed data that compresses a data vector including data corresponding to the at least one key;

decrypting the compressed index data using the secret key to acquire the index vector; and acquiring the data corresponding to the at least one key from the compressed data based on the index vector, wherein the acquiring of the data corresponding to the at least one key comprises multiplying the compressed data by an inverse matrix of a transformation matrix generated by combining values corresponding to the index vector in a pre-stored matrix for compression and decompression to acquire the data corresponding to the at least one key.

* * * * *